(12) United States Patent
Wolf et al.

(10) Patent No.: US 7,835,947 B2
(45) Date of Patent: Nov. 16, 2010

(54) ADVERTISING AND DISTRIBUTION METHOD FOR EVENT PHOTOGRAPHS

(76) Inventors: Peter H. Wolf, 509 Raindance St., Thousand Oaks, CA (US) 91360-1219; Teresa M. Wolf, 509 Raindance St., Thousand Oaks, CA (US) 91360-1219

( * ) Notice: Subject to any disclaimer, the term of this patent is extended or adjusted under 35 U.S.C. 154(b) by 1192 days.

(21) Appl. No.: 11/419,545

(22) Filed: May 22, 2006

(65) Prior Publication Data
US 2006/0287930 A1   Dec. 21, 2006

Related U.S. Application Data

(60) Provisional application No. 60/691,000, filed on Jun. 15, 2005.

(51) Int. Cl.
*G06Q 30/00* (2006.01)
(52) U.S. Cl. ........................................................ 705/26
(58) Field of Classification Search .................... 705/26, 705/27, 14
See application file for complete search history.

(56) References Cited

U.S. PATENT DOCUMENTS

| | | | |
|---|---|---|---|
| 3,946,312 A | 3/1976 | Oswald et al. | |
| 4,571,698 A | 2/1986 | Armstrong | |
| 4,752,764 A | 6/1988 | Peterson et al. | |
| 5,245,162 A | 9/1993 | Takahashi | |
| 5,511,045 A | 4/1996 | Sasaki et al. | |
| 5,696,481 A | 12/1997 | Pejas et al. | |
| 6,064,308 A | 5/2000 | Janning et al. | |
| 6,072,751 A | 6/2000 | Kirson et al. | |
| 6,600,407 B2 | 7/2003 | Paek | |
| 6,917,565 B2 | 7/2005 | Kishida | |
| 6,985,875 B1 | 1/2006 | Wolf | |
| 2003/0235116 A1 | 12/2003 | Stobbe | |
| 2004/0100566 A1 | 5/2004 | Valleriano et al. | |
| 2004/0213087 A1 | 10/2004 | Gillette et al. | |
| 2005/0097438 A1* | 5/2005 | Jacobson | 715/500.1 |
| 2006/0229940 A1* | 10/2006 | Grossman | 705/14 |
| 2007/0067297 A1* | 3/2007 | Kublickis | 707/9 |

* cited by examiner

*Primary Examiner*—Mila Airapetian
(74) *Attorney, Agent, or Firm*—Kelly Lowry & Kelley, LLP

(57) ABSTRACT

A method for providing on-line event photographs includes the steps of capturing multiple photographs during an event, and associating identifying data with each photograph taken. A database is accessed to search for the photograph utilizing the identifying data. A photograph is selected for ordering at a reduced price or for free. A field is created in the digital photograph, such as in a corner or a margin thereof, and visual advertisement indicia is associated with the field. An electronic link may also be associated with the field for connecting the user to an advertiser's electronic document or website. The photograph, containing the visual field, is electronically transferred to the user's electronic device or otherwise sent to the user.

18 Claims, 4 Drawing Sheets

ADVERTISING AND DISTRIBUTION METHOD FOR EVENT PHOTOGRAPHS

BACKGROUND OF THE INVENTION

The present invention generally relates to event photography. More particularly, the present invention relates to a method for improving the ordering and distribution of event photographs on-line by utilizing advertisers.

Sporting event photography is well-known in the art. Photographs are taken of the event participants during the sporting event. Such sporting events include bicycle races, marathons, triathlons, etc. Preferably, the entire participant is photographed at a scenic point along the route, at the finish line, etc., so as to be interesting and capable of being purchased as a memento or keepsake of the event.

Traditionally, event photography relied on identifying markings commonly known as "bib numbers" that are attached on event participants, such as runners or bicycle riders, so as to be easily visible. Event photographs were taken along the event route or finish line and then developed or scrutinized for the identifying markings of each event participant. The name and mailing address of event participants who are identifiable by their bib number markings were then cross-checked to an address roster of the event participants that lists all the event participants, their bib or identification numbers, and their addresses. Thumbnail photographic images were then printed and mailed to the event participant, along with an order form to be filled out and transmitted back to the photographers by mail, fax, etc., accompanied by a check, money order or credit card authorization. Upon receipt of the order form, photographs were then developed and mailed back to the event participant to complete the transaction.

More recently, this process has been improved by offering the photographs via a web-site. U.S. Pat. No. 6,985,875 by the present inventor addresses this solution and is incorporated by reference herein. Wherein the traditional method was very costly due to multiple mailings between the photographer and event participants, and required several weeks or even months of time before event photographs were delivered, the inventor's on-line method provides the photographs very rapidly, usually within a few days, and at a substantially reduced cost. Moreover, the sporting event participants do not need to be identified by their bib numbers, but can be identified by their name or the approximate time the photograph was taken.

Although this method has improved the overall ordering process of event photographs, a few problems still exist. First, it has been difficult to attract potential customers to the web-site to search for their pictures. Second, there is the ongoing problem of enticing the customers to order the pictures or products. Methods of dealing with these drawbacks have included promoting, announcing and encouraging customers to search for their pictures; e-mailing potential customers a hyperlink to their picture; e-mailing potential customers a proof of their picture in very low resolution or quality; and mailing potential customers a proof of their picture with an order form or link to the web-site. However, these methods have been found to have limited success.

Accordingly, there is a continuing need for a method of improving the number of potential customers who visit the web-site to search for and order event photographs after an event has occurred. There is also a continuing need for additional revenue streams to event photographers. The present invention fulfills these needs and provides other related advantages.

SUMMARY OF THE INVENTION

The present invention resides in a method for providing on-line event photographs in a manner which increases the number of potential customers who visit the server to search for and order event photographs after the event has occurred. One aspect of the present invention is to offer a photograph at a substantially reduced price, or preferably for free, as an enticement for event participants to visit the web-site. The present invention also provides means for advertisers to directly advertise to the event participants. Such advertisements can be a source of income for event photographers, event organizers or web hosting companies.

The present invention comprises the steps of capturing multiple photographs, typically individuals, during an event. The present invention is particularly suited for capturing sporting event participants during a sporting event. Identifying data is associated with each photograph taken. For example, the identifying data may be at least one of: a time the photograph was captured, a name of the individual photograph, a number worn by the individual photographed, or a code from a device worn by the individual photographed.

A user accesses the database, usually a server, and searches for a photograph utilizing the identifying data. This may occur at the event or more typically at a location other than at the event. In response to the identifying data search, one or more photographs are posted. Typically, these photographs are relatively small images of a low quality resolution. Alternatively, or in addition to, the photographs may contain a watermark. These photographs are not intended for printing or downloading and keeping as a memento or keepsake. Instead, these photographs are to assist the user in selecting and ordering a photograph.

Once the user has selected a digital photograph to be ordered, an order screen enables the user to purchase the photograph. In accordance with the present invention, if the user desires to obtain the photograph at a significantly reduced cost, or for free, the user makes the selection. In response, a final digital photograph is created. This final digital photograph is preferably of a higher resolution and without the watermark so as to be desirable as a memento or keepsake. Moreover, one or more fields are created in the digital photograph. Visual advertiser indicia, such as the advertiser name or logo, are associated within the field. The field is typically created in a corner or a margin of the photograph. In a particularly preferred embodiment, an electronic link to an electronic document or web-site of the advertiser is associated with the field. Upon activating the link in the visual field, the user is connected to the advertiser's electronic document or web-site.

The selected and ordered final digital photograph, containing the visual field advertiser indicia, is electronically transferred to the user's electronic device, such as a computer or a wireless device such as a cell phone or portable digital audio/visual players. This may be done by downloading the digital photograph, either automatically or upon the user's request, to the user's electronic device. Alternatively, the digital photograph, or a link to the digital photograph, is electronically mailed to the user. The final digital photograph may be enjoyed and viewed only on the electronic device, or more preferably, can be saved, forwarded to friends and family members, or even printed.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a method for advertising and distributing event photographs. More particularly, the present invention resides in a method for providing event photographs at a reduced fee, or preferably for free. This is intended to provide an enticement for customers to visit the event photographer's server, such as to order other pictures. As will be more fully described herein, the methodology of the present invention also enables directed advertising to the event participants, and provides an additional revenue stream for the event photographer, event organizer or web hosting company.

As described in U.S. Pat. No. 6,985,875, which is incorporated by reference herein, hundreds or even thousands of photographs can be taken at a given event. For example, during a triathlon or marathon, it is common for an event photographer to contact with the event organizer to take photographs of all the event participants. As described above, these event photographs are later presented to the event participants for ordering. The '875 patent describes a methodology of associating identifying data with each of the photographs which identifying data can be used to search for the photographs on-line, and subsequently order the photographs.

In a typical sporting event, such as a bicycle race, triathlon, marathon or the like, the event participants have registered for the event and have provided, among other information, their name and address. Each event participant is typically given a bib number to wear for identification purposes. Alternatively, or in addition to, in some events the participants may be given a passive or active electronic device having a unique code and which is typically for timing purposes. Identifying data, in the form of the event participant's name, bib number, device code, or the time the photograph was taken, is associated with each photograph. As those skilled in the art will appreciate that larger events, such as a marathon in a large city, they result in many thousands of pictures being taken of the event participants. Accordingly, the identifying data permits the event participants to search for their pictures. If the event participant was not able to be identified by name or bib number, the event participant can search by the approximate time the photograph was taken.

Figure 1:
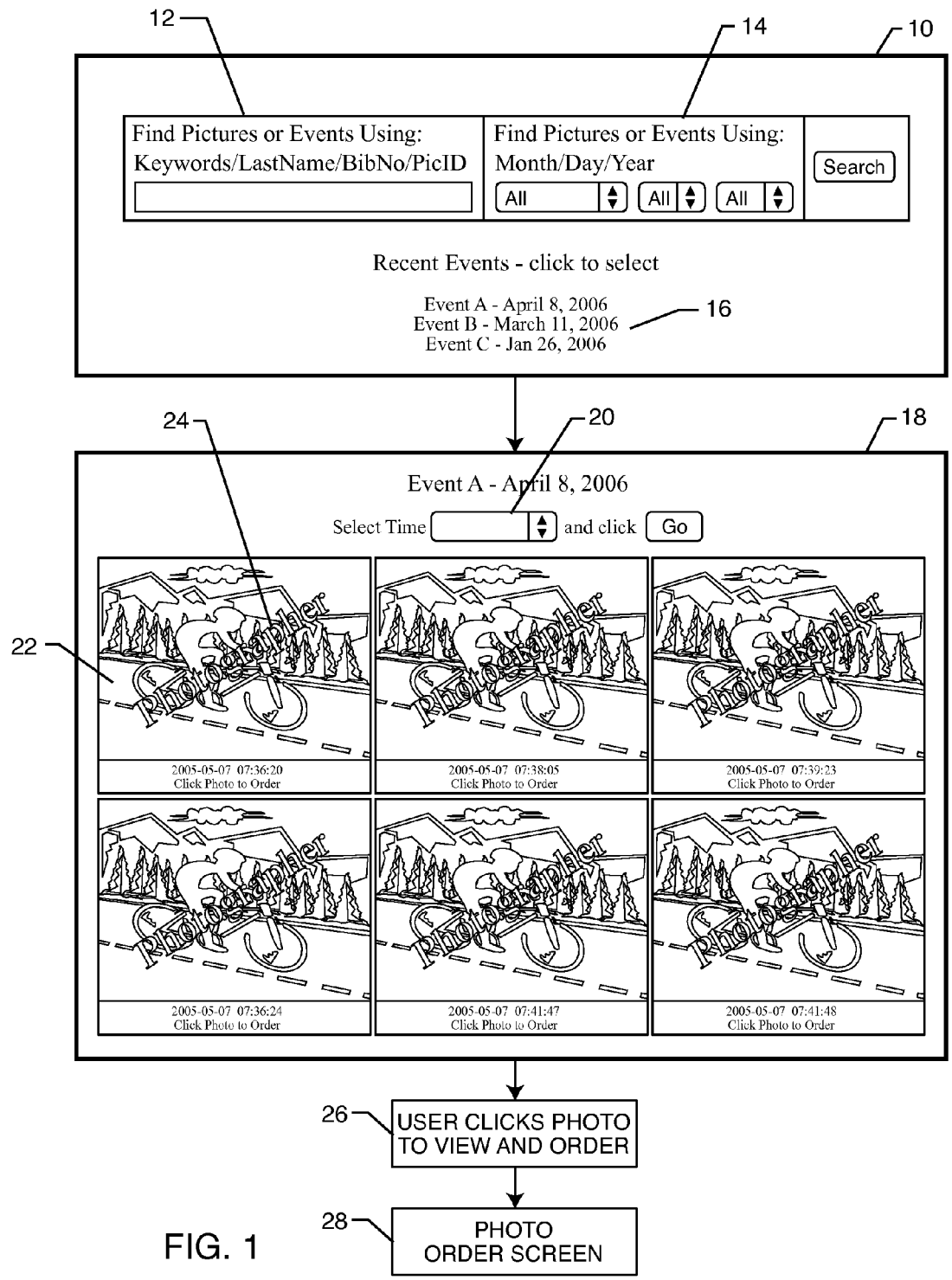
FIG. 1 is a flow diagram depicting the steps of searching for a photograph, in accordance with the present invention.

With reference now to FIG. 1, the digital photographs, catalogued by the identifying data, are saved in a database, such as on a server, for searching, viewing and ordering through an electronic network, such as the Internet. Although this may occur at the event, typically the photographs are searched for and ordered at a location other than the event, such as when the event participant visits the event photographer's website at his or her home, office, using a computer or portable electronic device. The location of the saved photographs, typically the event photographer's or web-hosting company's server, is provided to the event participants in their registration materials, at the event, in subsequent e-mail messages or mailings to them. When visiting the server 10, the event participant is provided with the opportunity to search for their pictures. Search boxes 12 and 14 may include entering a key word such as the name of the event participant, their bib number, electronic code, picture I.D. (if known) or the like. Alternatively, or in addition to, the event participant may be provided with an opportunity to find the pictures using a time. Initially, the event participant may select a date of the event, such as using box 14 in FIG. 1, or clicking a link to the event 16.

The user is then transferred to another server page containing information specific to the event and possibly containing a number of photographs, or even the photographs taken of the event participant if the initial identifying search data was specific enough to limit the selection of photographs to just the event participant's photographs. If the event participant selected the electronic link to the event or the date of the event, a more specific time 20 that the photograph was taken may be requested from the user so that photographs 22 taken approximately at that time are displayed to the user. As illustrated in FIG. 1, the user may be able to select the number of pictures per page, search by pages of photographs, or other identifying data as described above.

When the digital photographs 22 are displayed on the monitor, they are typically presented as a small image, such as a thumbnail image. Moreover, the digital photographs 22 are typically of a relatively low resolution or quality which is sufficient to identify the event participant, but which would not be desirable for downloading or printing as a memento or keepsake. Furthermore, the digital images 22 are typically labeled with a large watermark 24. These steps are taken to discourage the user from downloading or printing the picture from the web-site without ordering the picture. The user selects a photograph, typically by clicking on the photograph to view and order that photographic image 26. The user is then transferred to a photograph order screen 28.

Figure 2:
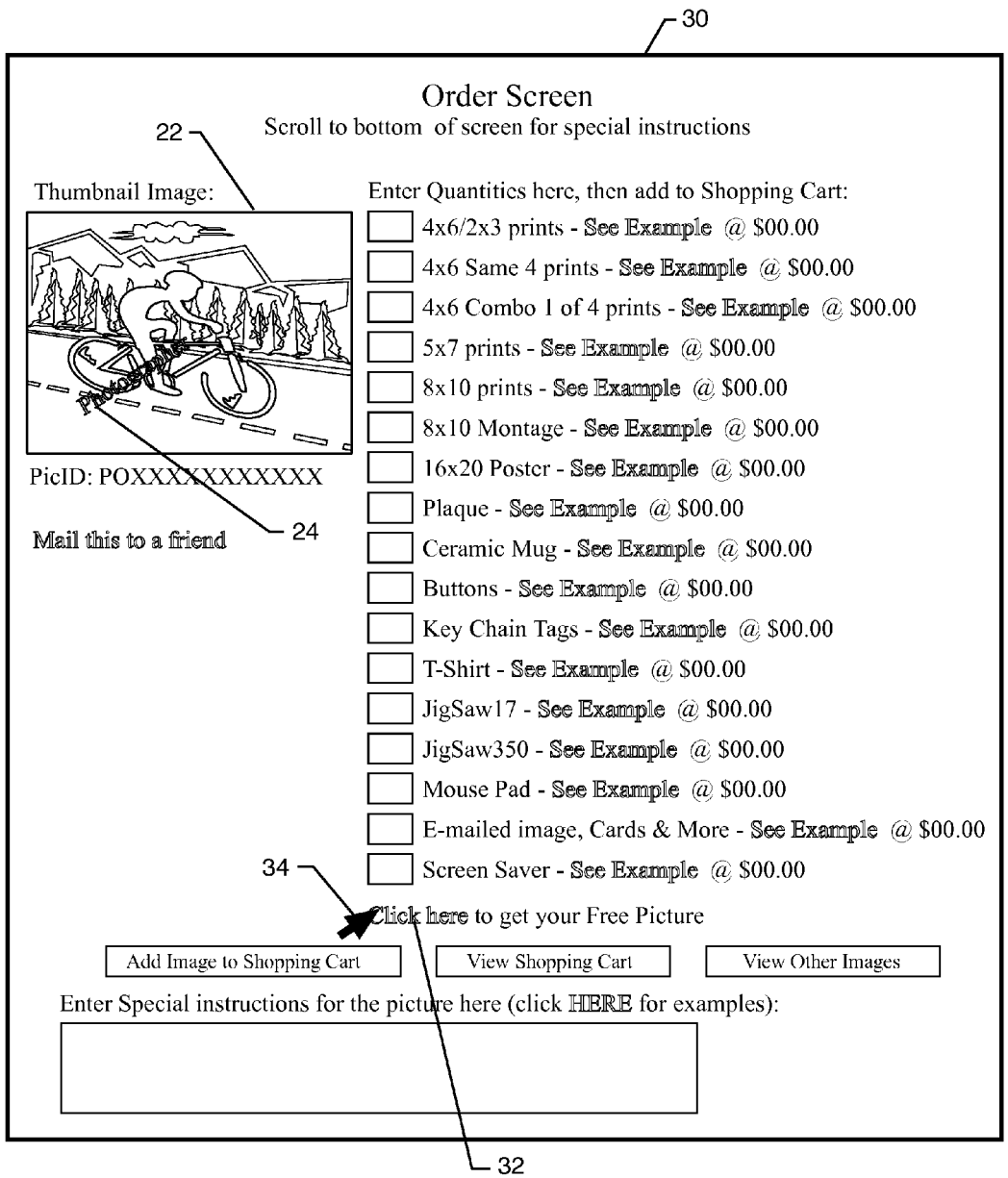
FIG. 2 is a diagrammatic view of an order screen for ordering photographs, in accordance with the present invention.

A representative photograph order screen 30 is shown in FIG. 2. Typically, the selected image 22 is shown on the order screen. This image 22 may be of the same small size as in the previous web page, or enlarged for better viewing. However, typically, the photographic image 22 still includes the watermark 24 labeling and/or is of a low quality resolution. The order form 30 allows the user/requestor to order various sized photograph prints, posters, plaques, etc. The photographs can be professionally printed in various sizes, or imprinted onto various products, as shown in the order form 30 of FIG. 2. Quality resolution images can also be ordered which will be e-mailed to the requestor. The cost for these vary between event photographers and the products selected. It will be appreciated that the vast majority of sales of the photographs are made shortly after the sporting event. As more time passes, the emotional attachment to the event and the interest in obtaining a photograph thereof diminish. Thus, it is important to direct the sporting event participants to the web-site as quickly as possible.

The inventor has found that offering a photograph at a very low price, or preferably even for free, satisfies many of these needs. As shown in FIG. 2, the order screen 30 includes a link 32 to "click here to get your own free picture". This may be done, for example, using a curser 34 operated by a mouse or the like.

Figure 3:
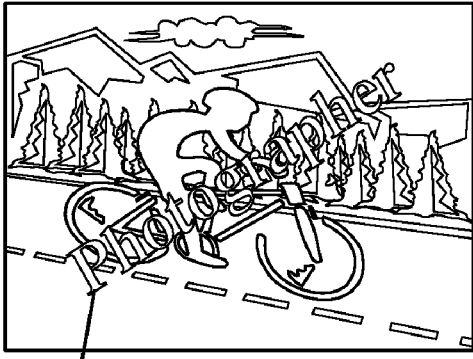
FIG. 3 is a diagrammatic view of an order form to order a photograph at a reduced cost or for free, in accordance with the present invention.

With reference to FIG. 3, the user is typically presented with an order screen or form 36 for obtaining the free picture. Information may be provided on this screen, such as alerting the requestor/user that only one free picture per event participant is available and/or advising the event participant to verify their photograph image 22 selection. The event participant may be required to enter personally identifying information, such as their name, address, telephone number, e-mail address or the like, as illustrated in FIG. 3. This information can be used to electronically transfer or mail the picture to the event participant. Moreover, the photographer may utilize this personally identifying information for later sale to event organizers, advertisers and the like. For example, the event participant may be required to enter their name, zip code, telephone number, e-mail address or any combination of these items. This will enable third parties to contact the event participant with targeted advertising and marketing campaigns. For example, if the individual ran in the Santa Barbara Marathon, the organizers of the Los Angeles Marathon may desire to contact that individual directly to seek registration in its event. Similarly, running shoe companies, companies representing magazines, etc., may wish to contact the event participant directly for targeted advertisement purposes. The sale of such personally identifying information provides a source of income to the event photographer. The requestor/event participant may be informed that as a condition of receiving the picture for free or at a significantly reduced price, the participant's information will be made available to third parties, such as the event organizer, advertisers, etc.

Of course, if the event photographer decides to keep the personally identifying information confidential, this information can still be used to send the picture to the requester, as described above. Also, this information can be used to verify that the sporting event participant is on the roster for the event. Such information can be used to limit a sporting event participant to only one free picture, so as not to adversely impact sales of printed photographs and products. The event photographer can adequately control the number of free pictures when an attendance roster is available. However, when there is no attendance roster, an unscrupulous event participant could potentially obtain multiple free pictures. To prevent this, each request for a free picture could place a cookie on the recipient's computer. A second free picture request could be denied if the cookie is detected. Alternatively, all e-mail addresses are logged whether they are associated with valid or denied entries. Users are required to use valid e-mail addresses. Thus, regardless of the name inputted into the web-site, as long as someone has used an e-mail address more than once for any event, the request is denied. Another method of preventing abuse of the free pictures is to match the event participant's last name entry to a previously entered identical e-mail address from any event. These safeguards can be implemented to protect the event photographer from losing potential photograph and product orders by those who would abuse the system when only a single picture or a limited number of free pictures are made available to each event participant.

Once the requestor/event participant has provided the necessary personally identifying information and has requested a free picture, as an incentive to order additional pictures and products, a discount may be provided to the event participant. For example, for a limited time, such as twenty-four hours, additional pictures, plaques, etc., could be ordered at the provided discount. This is intended to entice the event participant to order other products shortly after the event while there is still an emotional attachment to the event.

Once the requested information is provided and received, a higher resolution photograph without the watermark is transferred to the requester. This is typically done by enabling the requestor to download the image to his or her computer, other electronic devices such as cell phones or portable digital audio/visual players, or e-mail the image or a link to the downloadable image is sent to the requester. Of course, an actual printed picture may also be mailed to the requester. Since this requires that the event photographer incur an additional cost, a small charge may be applied to such instances of hard copy mailing.

Figure 4:
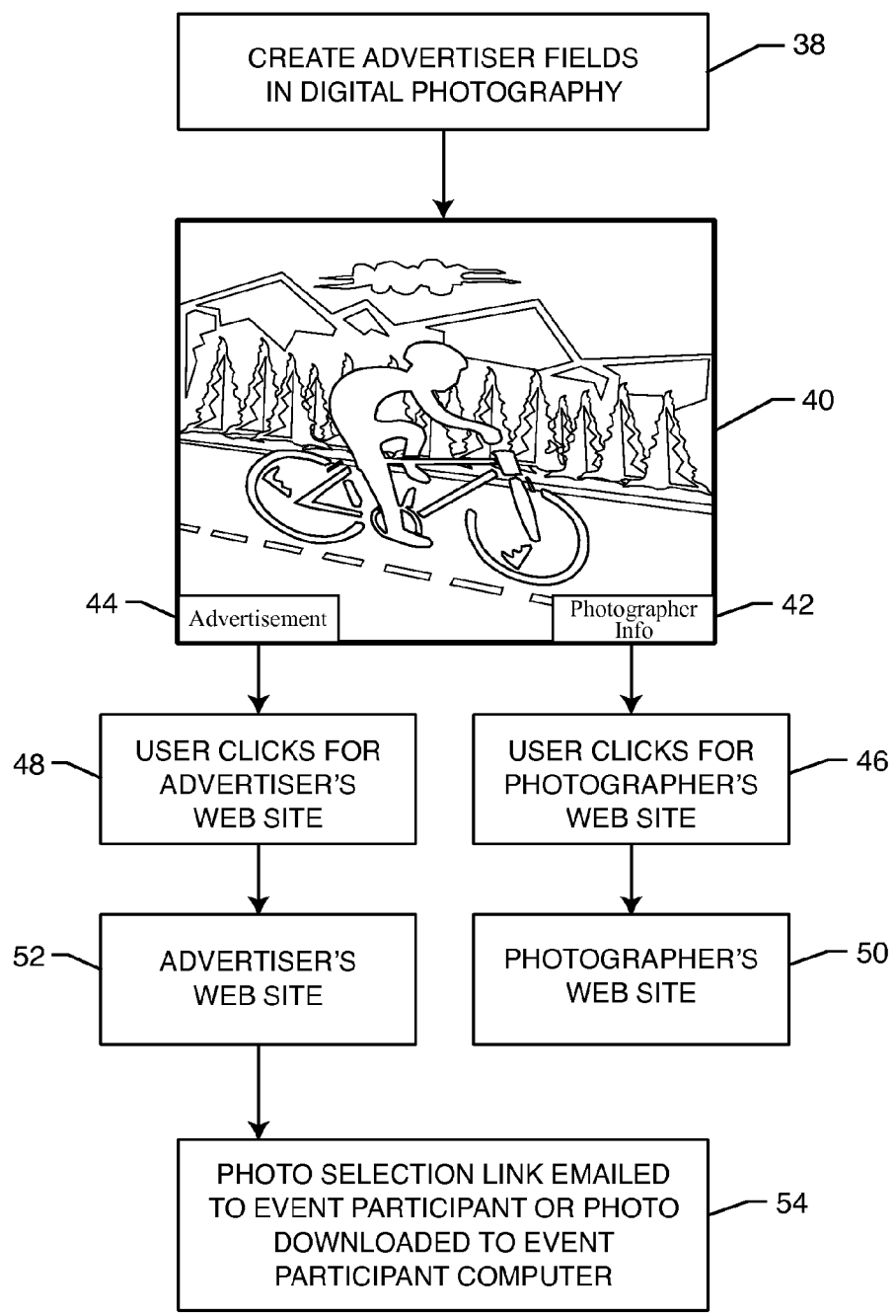
FIG. 4 is a diagrammatic flow chart, illustrating the steps for receiving a photograph having advertising fields contained therein, and accessing an advertiser's web-site using a link within the field, in accordance with the present invention.

In a particularly preferred embodiment, as illustrated in FIG. 4, advertiser fields are created in the digital photograph 38 using an electronic device, such as a computer. As illustrated in FIG. 4, a digital photographic image 40 is provided at a higher quality resolution and without the watermark 24. One or more advertiser fields 42 and 44 are created in the photograph 40. Such fields 42 and 44 are preferably created in the corners or along a margin, such as the upper, lower, or a side margin of the photograph 40 so as to have a minimal impact on the content of the photograph 40. The fields such as 42 and 44 are preferably translucent to further minimize the impact on the content of the photograph 40. Usually, these fields 42 or 44 are positioned in the photograph 40 so as not to obstruct the event participant that was photographed. The one or more fields 42 and 44 are imbedded with advertisers' names or logos, such that the advertisers' desired information is viewed in the digital photograph and preferably also viewable when the photograph 40 is printed. The fields 42 or 44 within the image could also contain necessary information to insure the photographer's copyright protection. The one or more visual fields 42 and 44, essentially comprising "real estate" on the photograph, can be sold to one or more advertisers. Such advertisers could comprise the event photographer, the event organizer, or other advertisers who wish to directly target the event participants. For example, with sporting events, such advertisers may comprise nutrition supplement companies, shoe companies, magazine companies, etc.

Although multiple advertisers can be present in a single photograph, it is preferable that only a single advertiser is present. Thus, if multiple advertisers are interested in purchasing "real estate" or fields on photographs of a given event, the event photographer or web-hosting company can assign a given number of photographs to each advertiser. For example, if there are 10,000 pictures posted on the server for an event, and there are three sponsors for which to purchase ad space, the total ad campaign can be sold for $10,000 (i.e., one sponsor on each of the 10,000 pictures for $1.00 per ad space). Sponsor A purchases $2,000 worth of ad space, sponsor B purchases $3,000 worth of ad space, and sponsor C purchases $5,000 worth of ad space. Thus, sponsor A's ad space will be placed on 2 out of every 10 pictures; sponsor B's ad space on 3 out of every 10 pictures; and sponsor C's ad space on 5 out of every 10 pictures. Software can be used to assign such ad space randomly.

The advertiser sponsor receives direct benefit in that the event participant, when viewing his or her pictures also views the logo and/or typed message in the ad space. Thus, the advertiser can target thousands of individuals directly after the event. Such advertisers can include the sponsors of the event, although the invention is not limited to such.

With continuing reference to FIG. 4, in a particularly preferred embodiment, an electronic link is embedded in the advertiser field 42 or 44 such that when a user activates the electronic link, such as by clicking on the visual field with a mouse or the like 46 or 48, the user is transferred to or provided with an electronic document, typically the advertiser's web-site 50 or 52. This hyperlink thus connects the user to additional information about the advertiser and its services and products.

Once the "final" photograph of increased resolution, without the watermark, and containing the visual fields 42 and 44 is created, it is transferred to the requestor. This transfer typically occurs by means of e-mailing the photograph to the event participant or enabling the photograph to be downloaded to the event participant's computer 54 or other electronic devices such as a cell-phone or portable digital audio/visual player. It will be appreciated by those skilled in the art that the transfer can take place by a variety of means. For example, the "final" photograph 40 can be automatically downloaded to the requestor's computer. Alternatively, the photograph 40 is displayed on the requestor's monitor such that the requestor can download the image, such as by clicking on a "download" button, right clicking the photograph to download it, etc. Alternatively, the digital photograph 40 can be e-mailed to the requestor's e-mail address. This can in the form of an attached file, or the e-mail message may include a link for the requestor to obtain a downloaded photographic image 40 containing the fields 42 or 44. Another method could involve the wireless transfer of the image from the photographer's or web-hosting server to a handheld device such as a cell phone or portable digital audio/visual player. Although the photograph 40 could be restricted to display on the monitor associated with the user's computer only, in a particularly preferred embodiment, the user is able to print the photograph, which would result in the printing of the advertiser field information as well. Of course, as described above, the photograph 40 could be professionally printed by the photographer and mailed to the event participant, in lieu of electronic transfer. However, it is anticipated that in most cases the photographs 40 will be electronically transferred, enabling the event participant to print the pictures 40 or e-mail them to family members and friends.

The free picture concept of the present invention is greatly enhanced by guaranteeing one or more quality pictures of each and every sporting event participant. Most event photographers can only capture 60%-90% of all participants as it is humanly impossible to capture more due to the strenuous physical and camera equipment demands involved with event photography (i.e., maintaining sharp focus of the event participant, proper exposure and suitable background with each picture, and one participant obscuring another participant from only one vantage point, batteries, memory chips and/or film needing to be replaced in the camera, etc.) These limitations can be overcome with the inventor's automated camera equipment described in U.S. patent application Ser. No. 11/008,697, which is incorporated by reference herein.

The event photographer or web-hosting company are provided with an additional income stream from event organizers and sponsors who are interested in the event participant information, and purchasing the ad space within the photographs. The event photographers or web-hosting company are also potentially given contact information for directly contacting event participants to promote their services, event photographs and products. Of great importance is the increase in traffic to the event photographer's server or web-hosting company's web-site, which results in an increase in the number of pictures and products ordered or web-hosting services sold.

Those skilled in the art will appreciate that the present invention benefits not only event photographers, but also the sporting event participants who receive a free digital image, as well as advertisers/sponsors, web-hosting companies and the event organizer. The event participants are able to obtain a good quality free image, which has not been available in the past.

Of course, advertisers/sponsors are able to target their advertisements to event participants, and provide links to their web-sites to increase traffic and awareness of their web-sites and related products and services. Event sponsors and advertisers benefit from greater exposure of their logo or advertising message on the free pictures as it has been found that these pictures frequently proliferate among friends or on Internet web-sites long after the event is over.

The event organizers benefit by offering enhanced services with a free picture to each of their participants, thereby attracting more participants to the event. Moreover, event organizers have the option to charge and justify a modest additional fee for the free picture service in the registration cost. The event organizers now may also negotiate additional costs from sponsors or advertisers who receive ad space in the free pictures.

Currently, event photographers pay event organizers for the opportunity to photograph the event, anticipating that the revenue generated from the sale of the event photographs will exceed the amount paid to the event organizer. However, with the methodology of the present invention, it is contemplated that the ability of the event organizer to offer at least one free picture per event participant may be sufficiently valuable to the event organizer that the event photographer will no longer have to pay such a fee, or that the event organizer could even potentially pay the event photographer to photograph the event and offer the free pictures. It is anticipated that sufficient additional revenue might be generated by the event organizer in registration fees to the event participant registrants to accomplish this. Moreover, the event photographer may obtain sufficient revenue from advertiser sources that all photographs taken during the event could be offered for free, provided they included the advertising fields mentioned above. Alternatively, after the initial free picture, additional pictures could be ordered by the event participant at a modest cost which would include advertiser fields.

The web-hosting company benefits by promoting their own services with each free picture through ad space on the free picture. Currently, event photographers pay web-hosting companies for hosting their event images on the web-hosting company's servers with Internet access. Permission by the photographer to allow web-hosting companies to offer free pictures and/or promote the web-hosting services as ad space on the free picture could offset some or all the fees normally charged to the photographer by the web-hosting company for hosting the event pictures on the web-hosting server with Internet access.

Although several embodiments have been described in detail for purposes of illustration, various modifications may be made to each without departing from the scope and spirit of the invention. Accordingly, the invention is not to be limited, except as by the appended claims.

What is claimed is:

1. A method for providing on-line event photographs, comprising the steps of:

capturing multiple photographs of sporting event participants during a sporting event;

associating identifying data with each photograph taken and storing the photographs in a database;

accessing the database and searching for a photograph utilizing the identifying data and selecting a digital photograph;

creating a field in the selected digital photograph and associating visual advertiser indicia within the field;

associating an electronic link to an electronic document or web-site related to the advertiser indicia with the field, wherein the electronic link is adapted, upon activation, to connect the user to the electronic document or web-site; and transferring the selected photograph containing the visual field with advertiser indicia to a requestor.

2. The method of claim 1, wherein the associating step comprises the step of associating at least one of: a time the photograph was captured, a name of the individual photographed, a number worn by the individual photographed, or a code from a device worn by the individual photographed.

3. The method of claim 1, wherein the accessing step comprises the step of accessing the database at a location other than at the event.

4. The method of claim 1, including the step of posting one or more photographs of a low quality resolution or containing a watermark in response to an identifying data search.

5. The method of claim 1, wherein the creating step includes the step of creating a visual field in a corner or a margin of the digital photograph.

6. The method of claim 1, wherein the associating advertiser indicia step comprises the step of inserting an advertiser name or logo into the field.

7. The method of claim 1, including the step of activating the link in the visual field, and connecting the user to the advertiser's electronic document or web-site.

8. The method of claim 1, wherein the transferring step comprises the step of downloading the digital photograph containing the field to the requestor's electronic device.

9. The method of claim 1, wherein the transferring step comprises the step of electronically mailing the digital photograph containing the field or a link to the digital photograph containing the field to the requestor.

10. The method of claim 1, including the step of offering the photograph containing the field to the requestor at a reduced fee or for free.

11. The method of claim 4, wherein the creating step includes the step of providing a final high resolution photograph without a watermark after the photograph has been selected and ordered and into which the field is created.

12. The method of claim 1, wherein the storing step comprises the step of storing the photographs in a network accessible server.

13. A method for providing on-line event photographs, comprising the steps of:

capturing multiple photographs of sporting event participants during a sporting event;

associating identifying data with each photograph taken, including associating at least one of: a time the photograph was captured, a name of the individual photographed, a number worn by the individual photographed, or a code from a device worn by the individual photographed;

accessing a database and searching for a photograph utilizing the identifying data;

selecting and ordering a digital photograph;

creating a field in a corner or margin of the selected digital photograph and associating visual advertiser indicia, including an advertiser name or logo, within the field;

associating an electronic link to an electronic document or web-site related to the advertiser indicia with the field, wherein the electronic link is adapted, upon activation, to connect the user to the electronic document or web-site; and electronically transferring the selected digital photograph containing the visual field with advertiser indicia to a user's electronic device by downloading the photograph to the user's electronic device or sending the user an electronic message including the digital photograph containing the field or a link to download the digital photograph containing the field.

14. The method of claim 13, wherein the accessing step comprises the step of accessing the database at a location other than at the event.

15. The method of claim 13, including the step of posting one or more photographs of a low quality resolution or containing a watermark in response to an identifying data search.

16. The method of claim 15, wherein the creating step includes the step of providing a final high resolution photograph without a watermark after the photograph has been selected and ordered and into which the field is created.

17. The method of claim 13, including the step of offering the digital photograph containing the field to the user at a reduced fee or for free.

18. The method of claim 13, wherein the storing step comprises the step of storing the photographs in a network accessible server.

\* \* \* \* \*